United States Patent [19]

Raymond

[11] 3,869,766

[45] Mar. 11, 1975

[54] PLASTIC SNAP FASTENER

[75] Inventor: Alain Raymond, Seyssinet Pariset, France

[73] Assignee: A. Raymond, Lorrach, Baden, Germany

[22] Filed: Dec. 21, 1972

[21] Appl. No.: 317,457

[30] Foreign Application Priority Data

Dec. 22, 1971  Germany............................ 2163686

[52] U.S. Cl..................... 24/216, 24/208 A, 24/217
[51] Int. Cl............................................. A44b 17/00
[58] Field of Search ......... 24/216, 217, 219, 208 A, 24/214, 213 R, 108, 220, 218

[56] References Cited
UNITED STATES PATENTS

| | | | |
|---|---|---|---|
| 2,585,897 | 2/1952 | Johnson | 24/217 |
| 2,624,090 | 1/1953 | Jones | 24/217 |
| 3,107,408 | 10/1963 | Huelster et al. | 24/208 A |
| 3,159,890 | 12/1964 | Jensen | 24/214 |
| 3,284,123 | 11/1966 | Adams | 24/216 |
| 3,396,436 | 8/1968 | Daddona | 24/208 A |
| 3,401,434 | 9/1968 | Daddona | 24/208 A |
| 3,613,181 | 10/1971 | Taylor | 24/216 |

Primary Examiner—Roy D. Frazier
Assistant Examiner—Darrell Marquette
Attorney, Agent, or Firm—James R. O'Connor

[57] ABSTRACT

A snap fastener combination of the type comprising four molded plastic component parts wherein the socket component has a cup-shaped flange joined to the central portion thereof adjacent the entrance to the stud receiving cavity of the socket component. The flange extends radially outwardly and upwardly from its junction with said central portion and is of reduced thickness adjacent said junction to provide a hinging web which renders the socket both radially and axially distensible responsive to insertion of the stud component into the socket cavity.

10 Claims, 7 Drawing Figures

PATENTED MAR 11 1975　　　　　　　　　3,869,766

PLASTIC SNAP FASTENER

BACKGROUND OF THE INVENTION

1. Field of the Invention

The invention relates generally to snap fasteners and more particularly to molded plastic snap fasteners of the type comprising four component parts, to wit, a stud component, a socket component, and rivets for securing the stud and the socket to support elements to be fastened. Snap fasteners of the type contemplated by the invention are usually found in U.S. Art Class 24, Subclass 208A entitled "Separable Fasteners . . . Plastic."

2. Description of the Prior Art

The prior art discloses numerous plastic snap fastener combinations of four components which form two-part coupling sections, i.e., a male and a female section, wherein the stud of the male section and the socket of the female section are each attached to a support element, usually the material of a garment, by means of a rivet connection. In designing the components of the known fasteners, the practice has consistently been to provide a relatively rigid connection between the wall or walls of the socket component defining its stud receiving cavity and the socket base which is attached to the support element. Thus, in the known sockets the cavity-defining wall(s) is capable of flexing only in a radial direction relative to the central axis of the socket responsive to stud insertion or removal during coupling or uncoupling of the two-part sections. Further, the known sockets and studs are usually provided with interlocking beads and rings which overlap in a plane which is perpendicular to the axes of the engaged components. The aforementioned types of fasteners are exemplified by the disclosures of U.S. Pat. Nos. 3,107,408; 3,159,890; 3,176,365; 3,401,434; 3,469,290; and 3,553,796. By reason of the relatively rigid, i.e., inelastic, joint at the socket wall and its base, the prior art devices have not proved operably efficient over a range of applications in that substantial temperature fluctuations tend to affect the resiliency of the components and the snap action and holding power become harder and stronger, respectively, in colder environments and softer and weaker, respectively, in hotter environments. In other words, the fasteners do not function uniformly over a range of applications where widely varying environmental conditions are experienced. This factor coupled with the substantially horizontal overlapping of the interlocking rings and beads of the mating components renders coupling and uncoupling of the components very difficult in colder environments and frequently results in tearing of the fabrics to which the components are attached by reason of the excessively high pulling force required to separate the fastener sections. Still further, to deliberately vary the on-off action of a fastener of a given size, the overall size of one of either the stud or socket components must be changed, i.e., reduced or enlarged.

Those who proceed to a consideration of the detailed description of this invention which follows will readily recognize that the herein disclosed fastener eliminates the aforementioned objectionable characteristics of the prior art devices by providing a socket component having an elastic hinging connection between its stud receiving portion and its base. This new design renders the fastener largely insensitive to temperature fluctuations and provides for substantially uniform coupling and uncoupling action. In addition, the components are so designed that the on-off action and holding power of the fastener can be deliberately tailored in a given size fastener to the precise degree desired by simply altering the relative angular relationships between certain portions of the stud and socket components relative to the axes of those components, without changing the overall size of either of the components.

Additional improvements in the art in which novelty is seen to abide will likewise become readily apparent to the reader.

SUMMARY OF THE INVENTION

A four-component snap fastener combination of a molded polymeric material includes a socket component having a central body portion defining a stud receiving cavity, and an integral, cup-shaped peripheral flange joined to the central portion at the lower end thereof and relatively proximate the entrance to the cavity. The flange extends radially outwardly and upwardly from its junction with the central portion and terminates in an upper planar surface or base which is adapted to engage a supporting workpiece to which the socket is attached at points substantially radially spaced from the central portion to provide for stabilization of the socket relative to the workpiece. The material thickness of the flange adjacent its junction with the central body portion is substantially less than the material thickness of the central portion at the entrance to the stud receiving cavity. Thus, the flange provides, adjacent said junction, a hinging web which renders the socket both radially and axially distensible responsive to insertion of the cooperating stud component of the fastener combination into the cavity or responsive to withdrawal of the seated stud component from the cavity.

DESCRIPTION OF A PREFERRED EMBODIMENT

The stud and socket component parts of the fastener combination described hereinafter are molded bodies of a firm but yielding, tenacious and resiliently distensible polymeric material and all component parts can generally be described as having the configuration of solids of revolution. The rivet components may be and usually are formed from a harder material than the stud and socket components.

Figure 1:
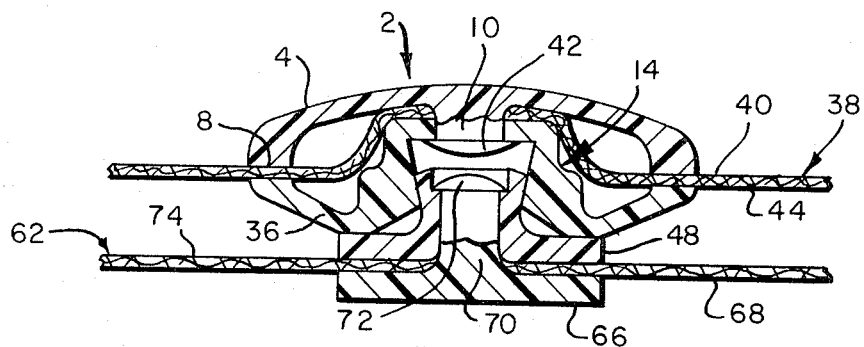
FIG. 1 is a transverse cross-sectional view of a snap fastener combination according to the invention depicting the stud and socket components secured to two cloth panels and coupled to one another.
Figure 2:
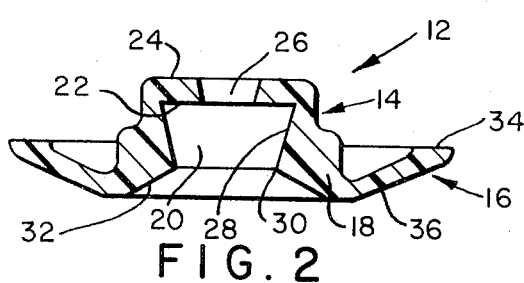
FIG. 2 is a transverse cross-sectional view of the socket component of the invention.
Figure 3:
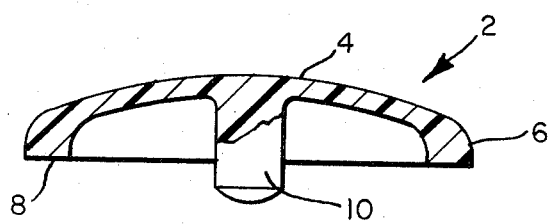
FIG. 3 is a view of the rivet for securing the socket component to a support element, the rivet being depicted partly in transverse cross section and partly in full.
Figure 4:
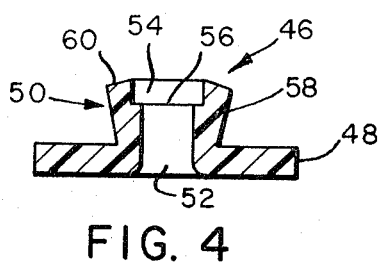
FIG. 4 is a transverse cross-sectional view of the stud component of the invention.
Figure 5:
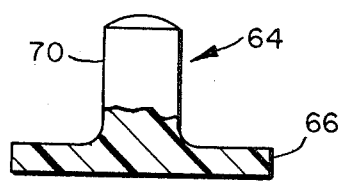
FIG. 5 is a view similar to FIG. 3 depicting the stud component securing rivet.

As shown in FIGS. 1 and 3, the rivet 2 includes a flange 4 having a depending, outer peripheral rim 6 terminating in a planar base or facing surface 8, and a centralized shank 10 depending from the underside of the flange 4. The socket 12 (see FIGS. 1 and 2) includes a central body portion 14 and a cup-shaped peripheral flange 16 joined to the lower end 18 of the central portion 14. The central portion 14 is hollow and defines a stud receiving cavity 20 having a roof 22 disposed adjacent the upper end 24 of said central portion. The upper end 24 of the central portion has a centralized opening 26 formed therethrough and communicating with the cavity 20. The cavity 20 is shaped in the form of an inverted frustum of a cone and thus presents an inner, peripheral socket wall 28 which diverges angularly outwardly relative to the socket's vertical axis, from the entrance 30 to the cavity to its roof 22. The lowermost internal portion of the socket's central portion has a frustoconical configuration and thus provides an internal peripheral wall which converges from the lower end of the socket to the entrance 30 to the cavity and thereby defines a camming surface 32 which facilitates mating stud insertion. Scoket flange 16 extends radially outwardly and upwardly from its junction with the central portion 14 and terminates in an upper planar surface 34 lying substantially transverse to the socket's axis and in a planar extension intersects said axis at an imaginary point disposed substantially upwardly from the entrance 30 to the cavity 20. As is clearly depicted in the drawing, the material of the flange 16 adjacent its junction with the central portion 14 is of appreciably reduced thickness and thereby provides a hinging web 36 which renders the socket both radially and axially distensible.

As best seen in FIG. 1, the socket is secured to a support element, to wit, an unperforated cloth panel 38, by the rivet 2, the shank 10 of which has pierced the panel 38 from one side 40 thereof and penetrated through the opening 26 in the socket and has been upset to provide a rivet head 42 which overlies and firmly grips the roof 22 of the socket cavity. Thus, the cloth panel 38 is clamped between the underside of the rivet flange 4 and the upper end 24 of the socket's central portion and is also clamped between the opposed facing surfaces 8 and 34 which are oppositely disposed and bear against the two sides 40, 44 of the panel 38.

The stud component 46 includes a peripheral, substantially planar base flange 48 and a shank 50 projecting upwardly from the base flange. An axial bore 52 extends through the shank 50 and flange 48 and the bore is countersunk at 54 to provide an enlarged portion defined at its base by internal radial shoulder 56. The outer peripheral wall 58 of the stud shank 50 diverges angularly outwardly relative to the shank's vertical axis from the base flange 58 toward the leading end of the shank, which leading end is at least partially chamfered to provide a camming surface 60. Referring again to FIG. 1, one will observe that the stud is secured to a second cloth panel 62 by the rivet 64 which has its base flange 66 disposed against one side 68 of the panel. The solid shank 70 of the rivet 64 has pierced through the panel 62 and penetrated into the through bore 52 and has been upset to provide rivet head 72 which lies within the countersunk portion 54 and grips the radial shoulder 56 to draw the base flange 48 of the stud tightly against the opposite side 74 of the panel 62.

From a further consideration of FIG. 1, the reader will readily recognize that the two cloth panels 38 and 62, which are representative of the opposing folds of a garment, are fastened by pressing the two, two-part coupling sections of the fastener combination together whereby the stud shank 50 is snap seated in the socket cavity 20 and the outer wall 58 of the stud shank locates behind the inner wall 28 of the socket defining its cavity. The improved design of the stud and socket components provides for a secure snap fastening which effectively resists accidental separation but is releasable responsive to a reverse axial pull of a reasonable force magnitude. During coupling of the male and female sections, the cooperating camming surfaces 16 and 32 of the stud and socket, respectively, facilitate entry of the stud into the open end 30 of the socket's cavity and socket central body portion 14 is distended both radially and, in a sense, axially about the hinging web 36 as the stud passes into the socket. A vector line indicating the overall direction of socket distension, upon both coupling and uncoupling of the components, would be disposed approximately perpendicular to the camming surface 32 of the socket. It will be appreciated that the socket's construction, and particularly the hinging web in its supporting flange, provides the requisite consistent elasticity in the socket to render the same largely insensitive to or unaffected by substantial environmental temperature fluctuations. Thus, a substantially uniform snap action is maintained and the probability of tearing the cloth panels during component separation is substantially diminished.

Figure 6:
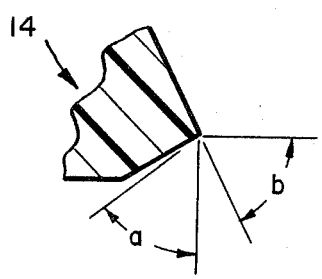
FIGS. 6 and 7 are enlarged, cross sections of portions of the socket and stud components, respectively, and depicting significant angular relationships of portions of those components relative to their vertical axes.
Figure 7:
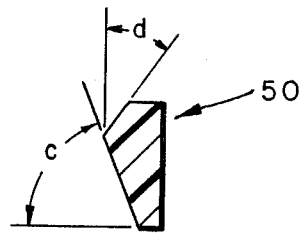

Referring now particularly to FIGS. 1, 6 and 7, one will readily recognize that the on-off action and the holding strength of the fastener may be varied, without altering the overall size of either the stud or socket, by varying one or more of the angles $a$, $b$, $c$ and $d$. For example, a decrease or increase in the size of angle $c$ and/or a corresponding decrease or increase in the size of angle $b$ will render the overlap of the stud and socket walls subsequent to component engagement greater or lesser as the case may be and thus increase or decrease the holding strength and force necessary to separate the components. Similarly, a variation in angles $a$ and/or $d$ which moves the camming surfaces 32 and 60 closer to the horizontal or closer to the vertical will increase or decrease as the case may be, the insertion force required to snap the components together. In other words the on action will be rendered easier or harder.

From the foregoing detailed description, one has been apprised of an improved snap fastener combination which is seen to represent a significant contribution to the art. One should, however, be cognizant of the fact that the description is to be considered in an illustrative rather than a limiting sense. Therefore, those who seek a more precise definition of the invention protected by these Letters Patent should refer to the claims which follow.

I claim:

1. A socket component for a separable snap fastener comprising a body of firm but yielding tenacious and resiliently distensible polymeric material in the form of a solid of revolution and including a central portion defining a stud receiving cavity, said cavity having a peripheral wall circumscribing the central axis of said socket and the roof of said cavity being disposed adjacent the upper end of said central portion of said socket, and an integral, cup-shaped peripheral flange joined to said central portion adjacent the lower end thereof and relatively proximate the entrance to said cavity and extending radially outwardly and upwardly at an acute angle relative to the central axis of the socket from its junction with said central portion and terminating in an upper planar surface which engages a support element to which the socket is attached at points substantially radially spaced from said central portion to stabilize said socket relative to the support element, said upper planar surface being located in a plane lying substantially transverse the central axis of said socket and intersecting said axis at an imaginary point disposed substantially upwardly of the entrance to said cavity, the material thickness of said flange adjacent its junction with said central portion being substantially less than the material thickness of said central portion for substantially the full depth of said cavity, said flange defining, adjacent said junction, a resilient hinging web about which said central portion of said socket distends and resiles responsive to the insertion of a cooperating snap fastener stud component into said cavity.

2. A socket component according to claim 1 wherein the upper end of said central portion has an axially disposed opening extending therethrough and communicating with said cavity adjacent the roof of said cavity, said opening being adapted to receive a separate fastening means for securing said socket to a support element.

3. The combination of the socket defined in claim 2 secured to a support element at one surface of the element by a rivet having a flange overlying and engaging the remote surface of the support element, a shank joined to said flange and extending through said support element and said axially disposed opening in the upper end of said central portion, and a head portion lying within said cavity and gripping the roof of said cavity.

4. The combination as set forth in claim 3 wherein said flange of said rivet has an inverted cup shape and includes a downwardly extending peripheral rim terminating in a lower planar surface, and the support element is clamped between the undersurface of said rivet flange adjacent said shank and the upper end of said central portion of said socket and between the lower planar surface of said rim of said rivet flange and the upper planar surface of said socket flange, which latter surfaces are disposed in opposed relationship on opposite sides of the support element.

5. A socket component according to claim 1 wherein said cavity is of an inverted frustoconical configuration providing a narrow entrance to said cavity and an internal peripheral wall diverging angularly relative to the central axis of said socket from the entrance to the roof of said cavity.

6. A socket component according to claim 5 wherein the lower internal surface of said central portion is of a frustoconical configuration providing an internal peripheral wall converging angularly relative to the central axis of said socket from the lower end of said central portion to the entrance of said cavity, thereby providing a camming surface facilitating socket distension and telescopic seating of a cooperating stud in said cavity responsive to forced insertion of the stud into said socket.

7. A separable snap fastener combination comprising a socket component as defined in claim 6 and a mating stud component, said stud component comprising a body of firm but yielding tenacious and resiliently distensible polymeric material in the form of a solid of revolution and including a peripheral base flange and a shank projecting axially upwardly from said base flange, said shank having an outer peripheral wall diverging angularly outwardly relative to the central axis of said shank from said base flange toward the leading end of said shank to provide a complementary stud surface for effecting an interlocking engagement with the peripheral wall of said socket cavity responsive to insertion of said stud shank into said cavity.

8. A separable snap fasteners combination according to claim 7 wherein said stud component has a central, open end, axial bore extending through said shank and said base flange thereof.

9. A separable snap fastener combination according to claim 7 wherein said shank of said stud component is chamfered to form a frustoconically shaped leading end portion providing a camming surface cooperable with the camming surface at the lower end of said central portion of said socket to further facilitate socket distension and passage of said stud shank into said cavity during coupling of said components.

10. A separable snap fastener combination according to claim 8 wherein said axial bore in said stud shank is countersunk to provide a portion of enlarged diameter and an internal radial shoulder at the base of said enlarged portion, said shoulder providing a seat for a rivet head for securing said stud component to a support element.

* * * * *